(12) United States Patent
Lum et al.

(10) Patent No.: US 7,428,656 B2
(45) Date of Patent: Sep. 23, 2008

(54) PERFORMING RETRY OPERATIONS

(75) Inventors: CheeWai Lum, Singapore (SG);
KokChoon See, Singapore (SG);
LianYong Tan, Singapore (SG);
KokSeng Lim, Singapore (SG)

(73) Assignee: Seagate Technology LLC, Scotts Valley, CA (US)

( * ) Notice: Subject to any disclaimer, the term of this patent is extended or adjusted under 35 U.S.C. 154(b) by 625 days.

(21) Appl. No.: 10/979,360

(22) Filed: Nov. 2, 2004

(65) Prior Publication Data

US 2006/0107092 A1 May 18, 2006

(51) Int. Cl.
*G06F 11/00* (2006.01)

(52) U.S. Cl. ............... 714/5; 714/1; 714/8; 714/16; 714/42

(58) Field of Classification Search .............. 714/1, 714/5, 8, 42, 16
See application file for complete search history.

(56) References Cited

U.S. PATENT DOCUMENTS

| 5,684,765 | A | 11/1997 | Matsumoto et al. ........... 369/13 |
| 5,721,816 | A | 2/1998 | Kusbel et al. .......... 395/182.13 |
| 5,808,825 | A | 9/1998 | Okamura ..................... 360/75 |
| 6,055,118 | A | 4/2000 | Du ............................. 360/46 |
| 6,084,733 | A | 7/2000 | Ohzeki et al. ................. 360/53 |
| 6,122,125 | A | 9/2000 | Clare et al. ................... 360/65 |
| 6,122,235 | A | 9/2000 | Arai ............................. 369/54 |
| 6,188,538 | B1 | 2/2001 | Mills et al. ............... 360/77.04 |
| 6,252,731 | B1 | 6/2001 | Sloan et al. ................... 360/31 |
| 6,268,974 | B1 | 7/2001 | Sloan et al. ................... 360/67 |
| 6,279,089 | B1 * | 8/2001 | Schibilla et al. ................ 714/1 |
| 6,490,691 | B1 * | 12/2002 | Kimura et al. ................. 714/8 |
| 6,493,165 | B1 | 12/2002 | Satoh et al. ................... 360/65 |
| 6,611,392 | B1 * | 8/2003 | Hasebe ......................... 714/5 |
| 7,003,689 | B2 * | 2/2006 | Arakawa ....................... 714/8 |
| 2001/0010605 | A1 | 8/2001 | Aoki | |
| 2002/0057510 | A1 | 5/2002 | Hoskins et al. | |
| 2002/0060874 | A1 | 5/2002 | Choo et al. | |
| 2003/0202268 | A1 | 10/2003 | Wang et al. | |
| 2004/0047063 | A1 | 3/2004 | Lum et al. | |

OTHER PUBLICATIONS

"Proposal for Streaming AV Commands", by Marc Noblitt, Aug. 23, 1999 T13.D99123, revision 1, 13 pages.

* cited by examiner

*Primary Examiner*—Robert Beausoliel
*Assistant Examiner*—Joseph D Manoskey
(74) *Attorney, Agent, or Firm*—Shumaker & Sieffert, P.A.

(57) ABSTRACT

A method of performing a retry procedure may begin with detecting an error in a first zone of a data storage medium. Upon detecting the error, it is determined whether any retry procedure of a sequence of retry procedures has been performed upon detecting a previous error in the first zone. If a first retry procedure of the sequence was unsuccessfully performed upon detecting the previous error, there is performed a second retry procedure that follows next after the first retry procedure in the sequence.

21 Claims, 6 Drawing Sheets

Retry History Table

| Entry Number | LBA Location | Retry Type | LBA Retry Bit | Count of Retry Hits |
|---|---|---|---|---|
| 1 | 70000 | 7 | 0 | 1 |
| 2 | 300 | 3 | 1 | 1 |
| | | | | |
| | | | | |

| Retry Statistics Table | |
|---|---|
| Retry Type | Retry Hits |
| 3 | 91 |
| 7 | 82 |
| 8 | 74 |
| 5 | 63 |
| 2 | 57 |
| 6 | 47 |
| 9 | 32 |
| 1 | 23 |
| 10 | 18 |
| 4 | 12 |

PERFORMING RETRY OPERATIONS

TECHNICAL FIELD

This description relates to performing retry operations.

BACKGROUND

Data storage devices, such as those that include disc-shaped data storage media like disc drives, record data in tracks on the data storage media and also read recorded data from the tracks. Devices do this by positioning a read/write head with a signal transducer over a track so that data can be written to or read from the track.

Errors in reading or writing data can occur due to various causes, such as problems with positioning the head or irregularities in the track and storage media. For example, a read error may occur because of scratches on the media, asperity (or roughness) of the storage media surface, and non-homogeneity in data storage material over the media. Read errors may also occur due to track "wander", wherein the track does not follow an expected path. Errors at different locations on the data storage media may be caused by different things and may require different retry procedures to correct. Additionally, a detected error may change over time. Errors may occur over time, perhaps because the data storage media deteriorates or is damaged.

When an error occurs while data is written to or read from a track, the device may perform a retry operation in an attempt to correct the error. A device may include a variety of retry procedures, also sometimes referred to as error recovery routines. A retry procedure may be designed for one or more specific types of error. If performing a specific retry operation does not overcome the error, the device may perform another retry procedure. If none of the performed retry operations are successful, i.e. if none of them are able to correct the error, the device may interpret this as a "hard" error and consider that location on the track no longer usable. Some devices monitor successful performances of specific retry procedures and use this success rate in selecting which retry procedure to perform first.

Thus, having several retry procedures at the device's disposal may be a powerful way of attempting to overcome a detected error. However, it takes a finite time to perform each retry procedure and it may be desirable to perform the retry procedures as quickly as possible, particularly where there is a high throughput of data, such as in an audio/video application.

SUMMARY

The invention relates to performing retry operations.

In a first general aspect, a method of performing a retry procedure comprises detecting an error in a first zone of a data storage medium, and determining, upon detecting the error, whether any retry procedure of a sequence of retry procedures has been performed upon detecting a previous error in the first zone. If a first retry procedure of the sequence was unsuccessfully performed upon detecting the previous error, the method comprises performing a second retry procedure that follows next after the first retry procedure in the sequence.

In selected embodiments there is a retry history table that may include a count of retry hits for any retry procedure listed in the retry history table. The retry history table may include a retry bit for any retry procedure listed in the retry history table, the retry bit indicating whether previous performance of a listed retry procedure was successful.

In selected embodiments there is a retry statistics table that indicates the sequence of retry procedures. The retry statistics table may be based on at least one selected from the group consisting of: zones of the data storage medium, wedges of the data storage medium, LBAs of the data storage medium, and combinations thereof. When no retry procedure is identified in the determination step, the method may comprise performing a retry procedure that is first in the sequence of retry procedures.

In a second general aspect, a data storage device comprises
  a data storage medium;
  a sequence of retry procedures that can be performed upon detecting an error in any of multiple zones on the data storage medium; and
  a retry history table, wherein if the retry history table indicates, upon the error being detected in a first zone, that a first retry procedure was unsuccessfully performed upon detecting a previous error in the first zone, the data storage device performs a second retry procedure that follows next after the first retry procedure in the sequence.

Selected embodiments may include a retry statistics table indicating the sequence of retry procedures.

In selected embodiments, the data storage device while offline performs unsuccessful retry procedures identified in the retry history table. The data storage device may cease performance of the identified unsuccessful retry procedures upon detecting a host interruption.

Embodiments of the invention may provide any or all of the following advantages: Improved performance of retry procedures; providing more efficient retry procedures; avoiding retry procedures that have previously been unsuccessful in overcoming an error in a particular zone; providing a more efficient data storage device; providing a data storage device that can perform retry operations more efficiently; providing a data storage device particularly suited for high-data throughput audio/video applications.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

Like reference numerals in the various drawings indicate like elements.

DETAILED DESCRIPTION

Figure 1:
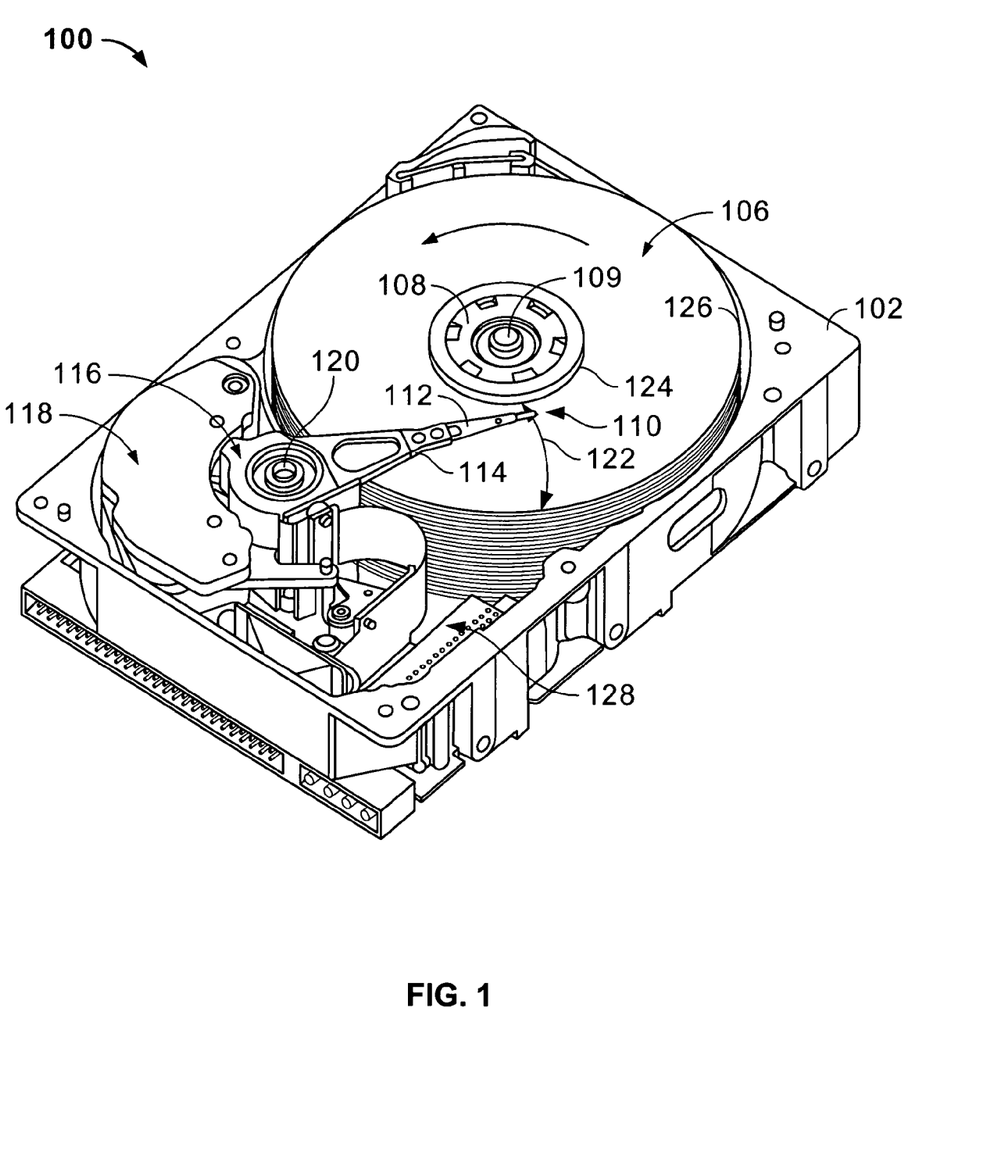
FIG. 1 is a perspective view of a data storage device.

FIG. 1 shows a perspective view of a data storage device 100 with which various embodiments of the present invention may be used. The device 100 may perform one or more retry procedures as will be described. Particularly, the device 100 may avoid performing a retry procedure on a zone where the procedure has previously been unsuccessful in overcoming an error.

The device 100 includes a housing with a base 102 and a top cover (not shown), and further includes a disc pack 106, which is mounted on a spindle motor (not shown) by a disc clamp 108. Disc pack 106 includes a plurality of individual discs that are mounted for co-rotation about central axis 109.

Each disc surface has an associated slider 110 that is mounted in the device 100 and carries a read/write head for communication with the disc surface. In the example shown in FIG. 1, sliders 110 are supported by suspensions 112 which are in turn supported by track accessing arms 114 of an actuator 116. The actuator shown in FIG. 1 is of the type known as a rotary moving coil actuator and includes a voice coil motor (VCM), shown generally at 118. Other types of actuators can be used, such as linear actuators.

VCM 118 may rotate actuator 116 with its attached sliders 110 about a pivot shaft 120 to position sliders 110 over a desired data track along a path 122 between a disc inner diameter 124 and a disc outer diameter 126. VCM 118 is controlled by a closed-loop servo controller within internal circuitry 128 based on position information, which is stored in dedicated servo fields on one or more of the disc surfaces. The servo fields can be interleaved with data sectors on each disc surface or can be located on a single disc surface that is dedicated to storing servo information. As slider 110 passes over the servo fields, the read/write head may generate a readback signal that identifies the location of the head relative to the centerline of the desired track. Based on this location, actuator 116 may move suspension 112 to adjust the head's position so that it moves toward the desired position. Once the head is appropriately positioned, servo controller 128 may execute a desired read or write operation.

Figure 2:
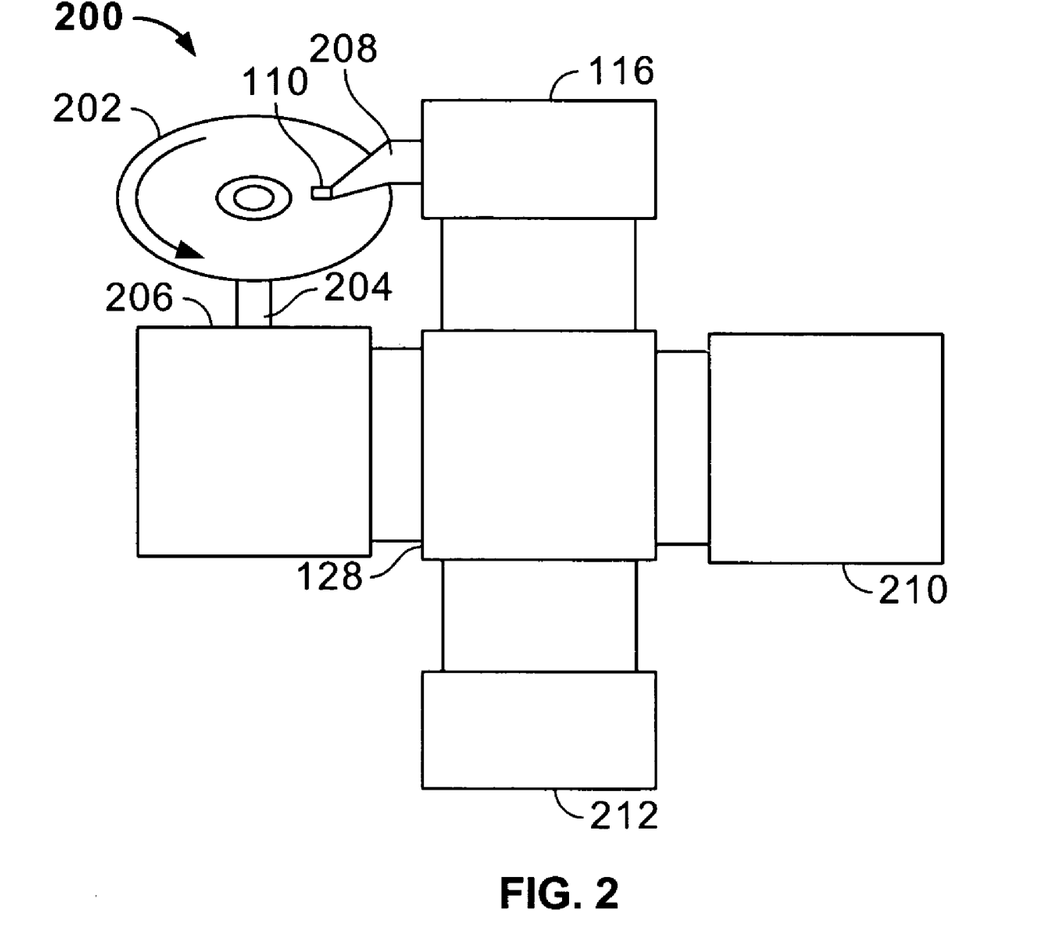
FIG. 2 is a block diagram of a data storage system.

FIG. 2 shows a simplified block diagram of a data storage system 200. For simplification, only one disc 202 of disc pack 106 (of FIG. 1) is shown. Spindle 204 connects disc 202 to spindle drive motor 206 that rotates disc 202 at high speed. Slider 110 that carries the read/write head is connected to actuator 116 through support arm 208. Controller 128 directs the action of actuator 116 that moves support arm 208. One or more host computer 210 is in communication with controller 128, which is adapted to receive commands from host 210 and operate the disc drive in accordance with these commands.

The controller 128 handles read and write operations using one or more logical block address (LBA). Upon the host computer 210 requesting a read operation, for example, the controller 128 may perform a seek on the disc and read data from the disc into disc drive buffer memory 212. If a read error occurs, the controller 128 may perform one or more retry procedures according to an error correction algorithm in an attempt to identify and correct the error at the failed sector. The controller 128 may use sector identification information provided by the error correction algorithm to perform the retry or retries.

There exists various retry procedures configured to address one or more of the errors that may be encountered. Such retry procedures may include changing the gain of a reading or writing circuit, looking for data in the vicinity of where the track was expected to be found (off-track checking), and changing the bias value of a magneto resistance (MR) element in the case where the MR element is used as a read head. For example, in a disc drive with a magnetic disc and a hard-disc controller, the retry procedures may be, for example, varying an off-track quantity which is an offset quantity between the center of the magnetic head and the center of the track, varying a bias current value given to an MR element in the case where a magnetic head is equipped with the MR element, or various automatic gain control factors such as the gain of the variable gain amplifier and the adaption rate of the finite impulse response filter. Retry procedures also may include one or more sequential subprocedures, wherein some deviation from a normal read or write operation parameter such as location or bias may be incrementally increased.

Figure 3A:
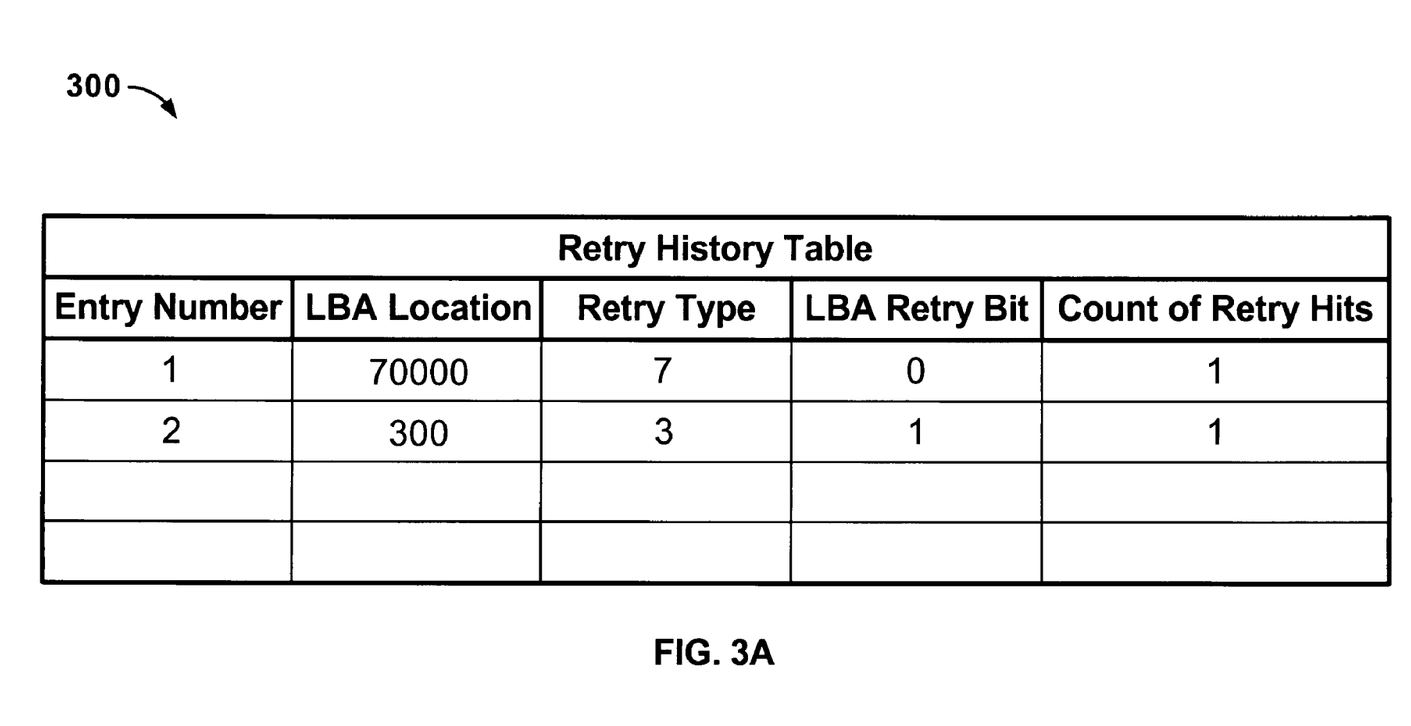
FIG. 3A shows a retry history table.

The device 100 may use one or more tables in the retry process. FIG. 3A shows a Retry History Table (RHT) 300 that may be used to track one or more retry procedures that are successfully or unsuccessfully performed on various disc zones. In this example, the RHT is based on LBAs and currently contains two entries. The first entry (Entry Number 1) indicates that, at LBA Location 70000, a retry procedure of type 7 was performed. The next column, "LBA Retry Bit," contains a zero, which indicates that the performed retry procedure was unsuccessful when performed on LBA 70000. The "Count of Retry Hits" column indicates that the type 7 retry procedure has been performed once in LBA 70000. Similarly, the second entry in the RHT indicates that a type 3 retry procedure has been performed once on LBA 300, and that the retry procedure was successful (because the LBA retry bit is a one). The RHT in this example is only an example; in some implementations the RHT could include a great number of entries corresponding to performed retry procedures.

Figure 3B:
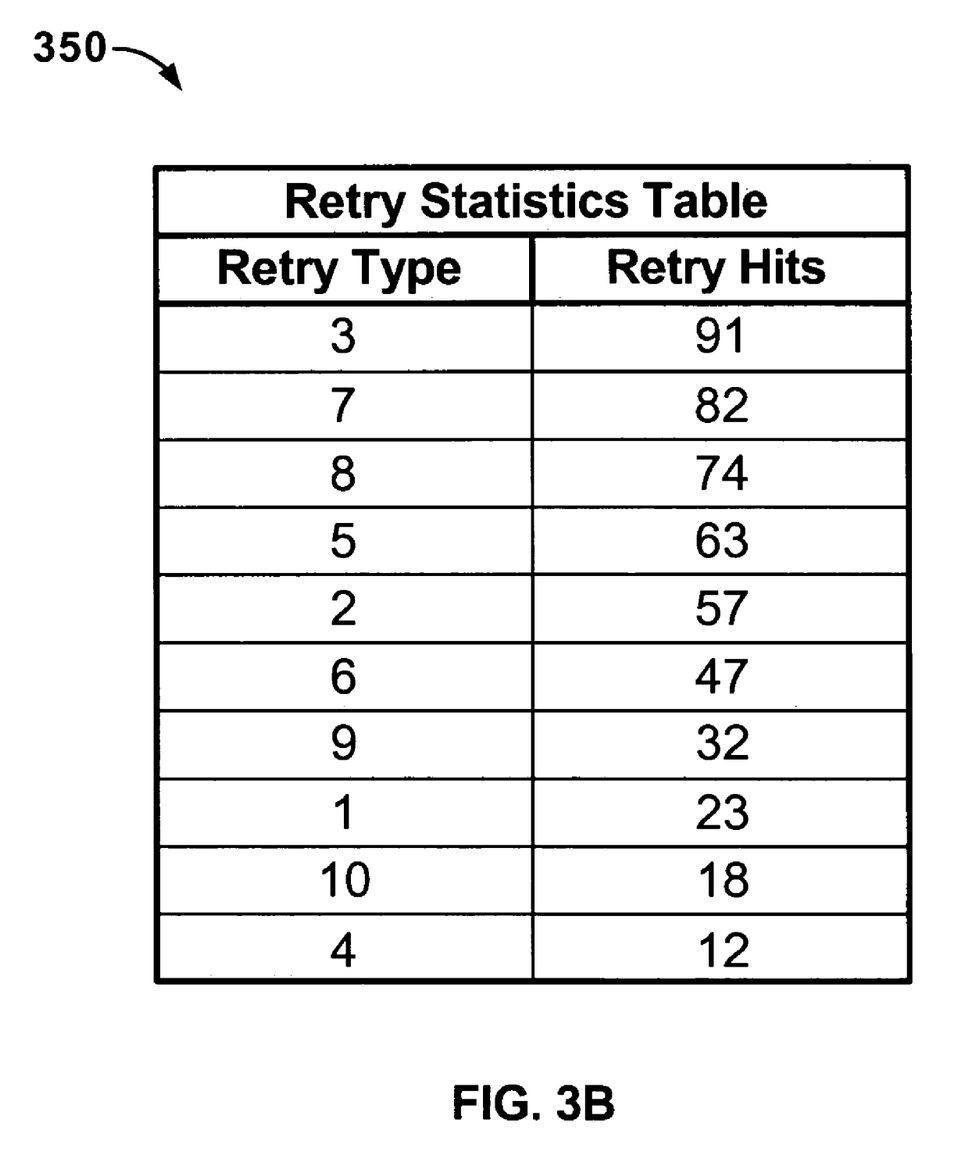
FIG. 3B shows a retry statistics table.

FIG. 3B shows a Retry Statistics Table (RST) 350 that may be used to track how frequently different retry procedures are performed. In this example, the RST tracks both retry procedures that are successfully performed and retry procedures that are unsuccessfully performed. For example, the RST indicates that the retry procedure type 3 has been performed 91 times (because it has 91 "Retry Hits"), and the retry procedure type 7 has been performed 82 times. The entries in the RST are currently organized the number of hits in descending order.

The RST may track performance of retry procedures based on any segment of the data storage medium. For example, the RST can be based on zones of the data storage medium, wedges of the data storage medium, LBAs of the data storage medium, and combinations thereof. The RHT lists the retry procedures 7 and 3 as having been performed once in the two exemplary LBAs. From the respective numbers of retry hits for these procedures in the RST, 91 and 82, it can be seen that the RST is based on information from more than one LBA.

The RHT and RST may be stored on the data storage medium, for example in a reserve sector. They may be accessed when necessary. When changes are made in either or both of them, the updated version may replace the existing version. In some implementations, the RHT and the RST are loaded into the drive buffer memory 212 when the device 100 enters power-up mode.

Figure 4:
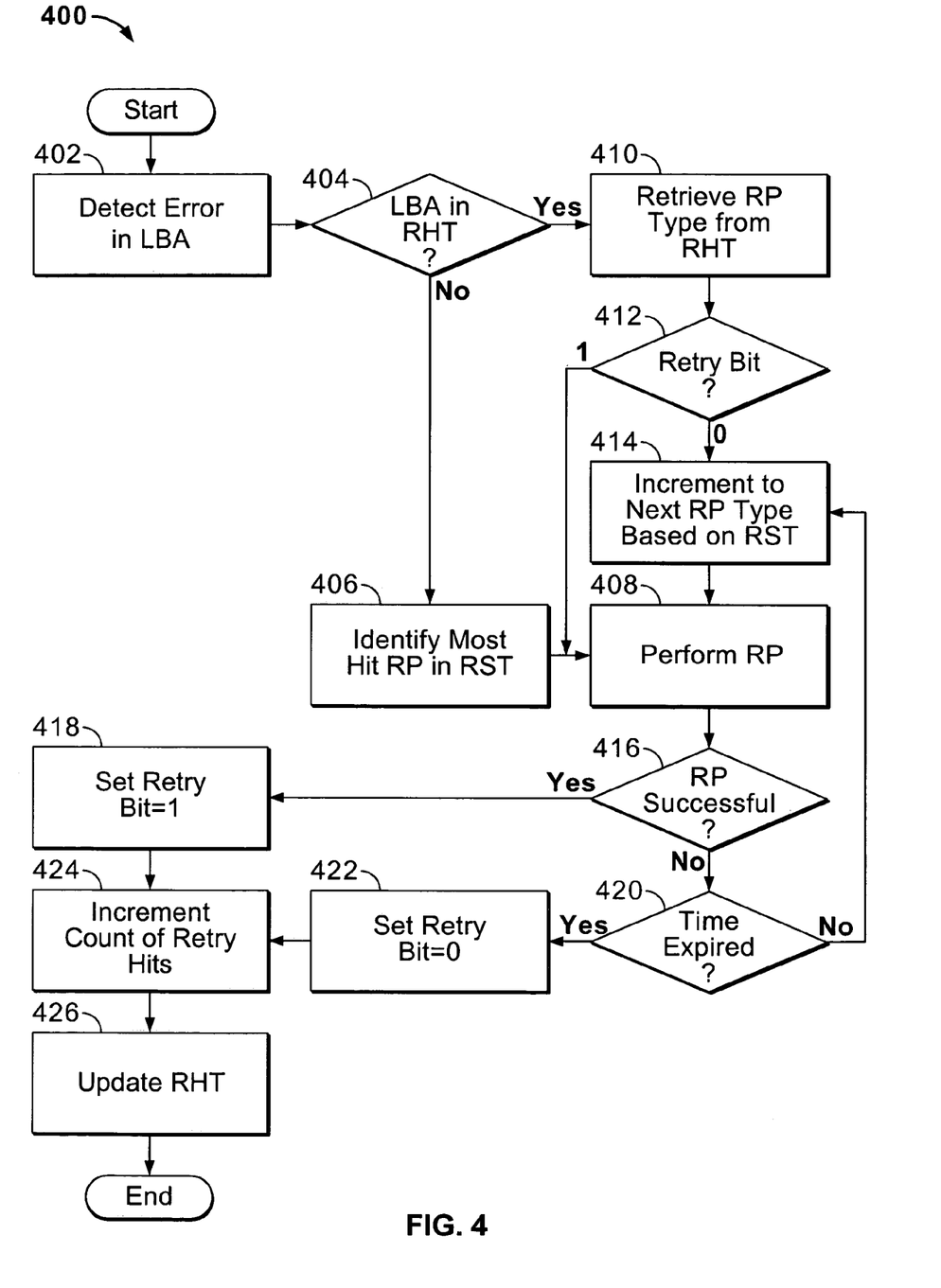
FIG. 4 is a flow chart of a method of performing a retry procedure.

An embodiment of an inventive method will now be described with reference also to FIG. 4, which includes a flowchart of a method 400. The method 400 can be performed in the device 100 with regard to the tables 300 and 350. For example, a computer program product can include executable instructions for carrying out the steps of the method 400.

The procedure begins, at step 402, with an error being detected in a particular LBA of the data storage medium (here referred to as "the LBA"). This may happen during a read operation or during a write operation. In step 404, it is determined whether the RHT contains any entry for the LBA.

If there is a history of at least one previous error in the same LBA, it may be useful to know what retry procedure(s) the device performed and whether it was successful or not. It may happen that the same or a similar type of error repeatedly occurs in the same LBA. While it is typically not known whether this is the case, the presence of historical information gives an indication of whether that particular retry procedure should be performed again. Accordingly, step 404 may involve accessing the RHT in the buffer memory 212 to determine whether the device previously has performed any retry procedure(s) for the LBA.

If there is no RHT entry for the LBA, the method may continue with selecting a retry procedure in step 406 from a statistical collection of retry procedures. That is, in the absence of historical information about the LBA where the error is detected, the device may proceed with selecting the retry procedure that is listed as number one in a sequence of retry procedures. The ordering of such a sequence may be based on any kind of statistical record keeping in the device. In this example the RST organizes the retry procedures by how many hits they have, and the device in step 406 identifies the procedure that has the most hits (i.e., that is listed as number one in the RST). Accordingly, the RST may identify a sequence of retry procedures and when an error is detected in a zone for which there is no information about previously performed retry procedures, the device may perform the retry procedures in the order of the sequence until the error is no longer detected (or until a time expiration occurs, as will be described).

If, on the other hand, it is determined in step 404 determines that there is an entry for the LBA in the RHT, the method in step 410 retrieves the type of retry procedure from the RHT. That is, the identifier listed in the "Retry Type" column may be retrieved. In step 412, the method queries whether previous performance of the listed retry procedure was unsuccessful. This may be determined by reading the LBA Retry Bit of the RHT. If the retry bit is one, that indicates that the retry procedure was successful when previously performed, and the method then proceeds with the step 408, where the previously successful retry procedure identified in the RHT is performed in response to detecting the error in step 402. If, in contrast, the retry bit is zero in step 412, the method continues with step 414 wherein the retry type of the identified retry procedure is incremented to the next retry procedure in the RST sequence. That is, if step 412 shows that a previously performed retry procedure was unsuccessful, the device does not presently perform that procedure again; nor does the device start over with the first procedure in the sequence, as it may do in step 406. Rather, in performing step 408 following step 414, the device performs the retry procedure that follows next after the retry procedure listed in the RHT.

Thus, the step 408 where a retry procedure is performed may be performed in either of three situations: If there is no LBA history, step 408 is performed according to the sequence of retry procedures (via step 406); if the RHT lists a successful procedure for the LBA, that procedure is performed in step 408 (via step 412); and if the RHT lists an unsuccessful procedure for the LBA, the procedure following next after that procedure in the sequence is performed in step 408 (via step 414).

In step 416 the outcome of the performed retry procedure is determined. This may be done by again attempting to perform the particular operation on the zone at issue, such as a read or write operations. If the retry procedure is successful, the RHT table is updated in step 418 to reflect this fact. That is, an entry may be created in the RHT for the particular LBA, listing the performed retry procedure and setting its retry bit to one.

If, in contrast, the retry procedure is not successful, the method determines in step 420 whether the time for performing the retry operation(s) has expired. For example, there may be a time limit (imposed by the device 100 or the host computer 210 or another entity) for how long the device 100 should perform error recovery on any detected error. Such a time limit may be set based on the type of application where data is read from, or written to, the data storage medium. For example, a short time limit such as 100-600 milliseconds may be set in applications involving streaming audio or video data.

If the time is not expired in step 420, the method increments to the next procedure in step 414. It is noted that this may be done whether the performed retry procedure was selected based on the RST (the step-406 route) or based on an RHT entry (the step-412 or step-414 route). Accordingly, the procedure following next after the performed one in the sequence is thereafter performed in step 408. This procedure (steps 414-408-416-420) may continue as long as the time does not expire in step 420.

If, on the other hand, the time is expired in step 420, the method proceeds with step 422 where the retry bit is set to zero. This indicates that the most recently performed retry procedure was unsuccessful. Additionally, the device may report a timeout condition to the host computer. Such a timeout condition may be treated like a "hard error" temporarily or indefinitely. That is, the device may consider the track location where the error was detected to be no longer usable, and below it will be described an offline process that can be used with such errors.

The next step in the flow chart is to increment, in step 424, the retry bit in the RHT for the most recently performed retry procedure. This step can follow upon a successfully performed retry procedure (via step 418) or upon the time expiring (via step 420). The RST may then be updated, in step 426, with information from the RHT.

Figure 5:
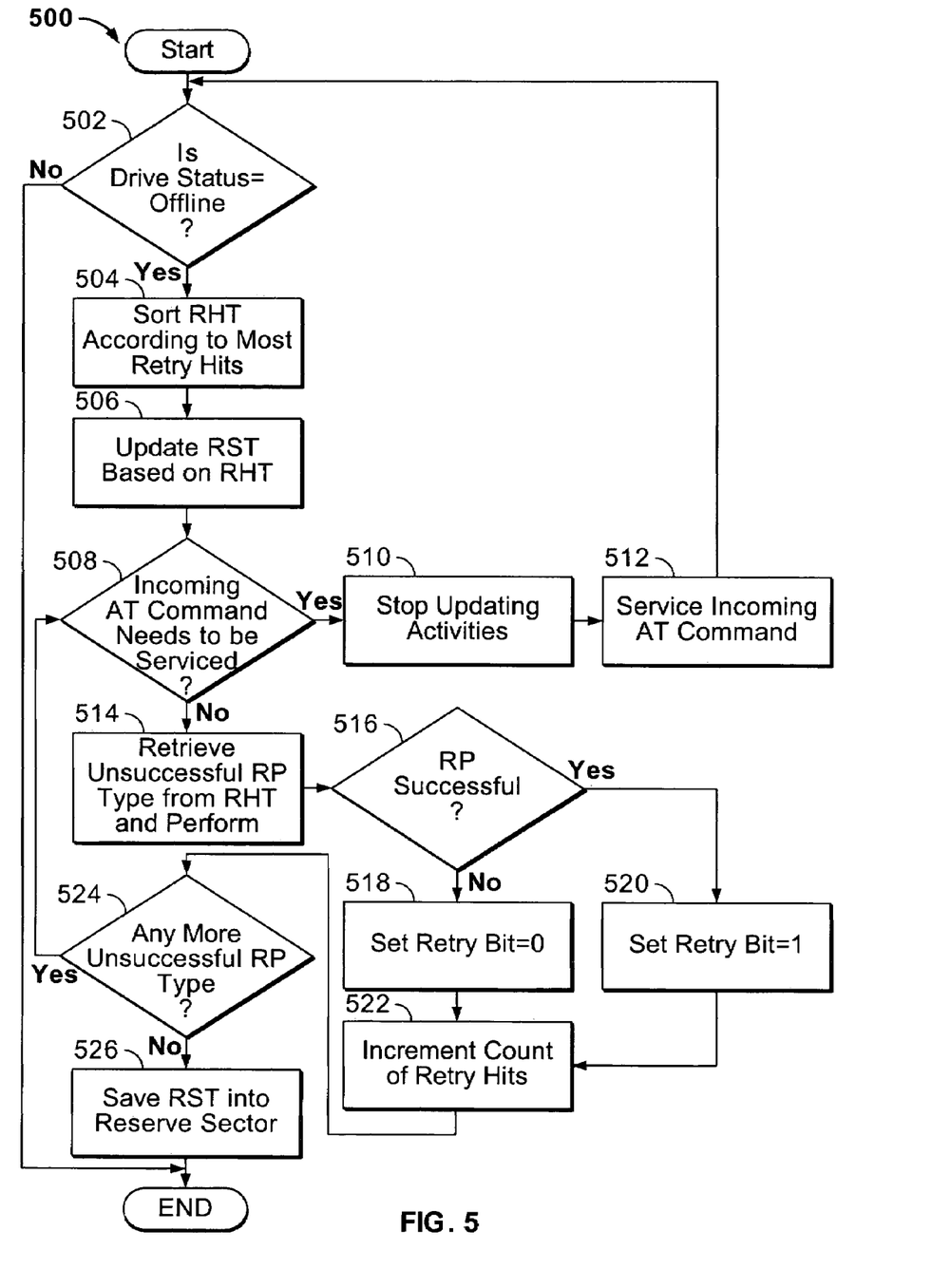
FIG. 5 is a flow chart of an offline method.

Thus, the RHT may have listed therein both retry procedures that have been successfully performed and retry procedures that have been unsuccessfully performed. From time to time or at regular intervals the device may again try to read (or write) the particular locations where one or more retry procedures previously have failed. FIG. 5 is a flow chart of a method 500 that can be used with a disc drive, which is an example of a data storage device. For example, a computer program product can include executable instructions for carrying out the steps of the method 500.

In step 502 it is determined whether drive status is offline. If the answer is yes, the method proceeds with step 504 where the RHT is sorted according to which retry procedure has the highest count of retry hits. In some implementations, one or more entries in the RHT that have the lowest count of retry hits are discarded in this process.

In step 506, the RST is updated based on the RHT. That is, the particular order of retry procedures in the RST may depend on the total number of retry hits for each one of them, and it may therefore be desirable to update the RST based on new information in the RHT.

In step 508, it is determined whether there has been received an incoming AT command that needs to be serviced. The AT command set relates to drive-host communications and may be part of the hard drive interface. If an AT command is received, the updating activities are ceased in step 510 and the incoming AT command is serviced in step 512. Thereafter, the process returns to the beginning of method 500.

If, in contrast, no incoming AT command currently needs to be serviced in step 508, the method continues with step 514 where an unsuccessful retry procedure type is retrieved for the RHT. That is, the RHT may be accessed to determine whether any retry procedure listed therein has a retry bit of zero. If one or more such procedure exists, its type is retrieved and that retry procedure is thereafter performed in the zone where the error was detected, such as a particular LBA. In step 515, it is determined whether the performed retry procedure is now successful. For example, it is determined whether the read or write operation can be completed following the retry procedure. If the retry procedure is not successful, its retry bit may be set to zero in step 518. It is noted that the currently stored retry bit may be inaccurate due to storage media deterioration or environmental factors. Accordingly, step 518 may be performed to ensure that the latest update of the retry bit is stored.

If, on the other hand, it is determined in step 516 that the retry procedure is successful, its retry bit is set to one in step 520. This indicates that the retry procedure is successful for this particular drive location.

Whether the retry procedure was successful or unsuccessful, the method in step 522 increments by one the count of retry hits for this retry procedure in the RHT.

In step 524 it is determined whether the RHT lists any additional unsuccessful retry procedure. If there is at least one additional unsuccessful retry procedure, the method returns to step 508 where it is determined whether an incoming AT command currently must be serviced. That is, in the absence of host interruptions, the device may remain offline and continue trying previously unsuccessful retry procedure(s) listed in the RHT (through step 514, 516, and so on).

If, in contrast, the RHT in step 524 does not contain any additional unsuccessful retry procedure, the method continues with step 526, where the updated RST is stored in a reserve sector of the drive.

The invention can be implemented in digital electronic circuitry, or in computer hardware, firmware, software, or in combinations of them. Apparatus of the invention can be implemented in a computer program product tangibly embodied in an information carrier, e.g., in a machine-readable storage device or in a propagated signal, for execution by a programmable processor; and method steps of the invention can be performed by a programmable processor executing a program of instructions to perform functions of the invention by operating on input data and generating output.

A number of embodiments of the invention have been described. Nevertheless, it will be understood that various modifications may be made without departing from the spirit and scope of the invention. Accordingly, other embodiments are within the scope of the following claims.

What is claimed is:

1. A method of performing a retry procedure, the method comprising:
    detecting an error in a first zone of a data storage medium;
    determining, upon detecting the error, whether any retry procedure of a sequence of retry procedures has been performed upon detecting a previous error in the first zone; and
    if a first retry procedure of the sequence was unsuccessfully performed upon detecting the previous error, performing, upon detecting the error, a second retry procedure that follows next after the first retry procedure in the sequence without performing the first retry procedure.

2. The method of claim 1, wherein the determination involves accessing a retry history table.

3. The method of claim 2, wherein the retry history table includes a count of retry hits for any retry procedure listed in the retry history table.

4. The method of claim 3, further comprising sorting the retry history table based on the count of retry hits.

5. The method of claim 3, further comprising discarding entries in the retry history table with a lowest count of retry hits.

6. The method of claim 3, wherein the retry history table includes a retry bit for any retry procedure listed in the retry history table, the retry bit indicating whether previous performance of a listed retry procedure was successful.

7. The method of claim 2, further comprising identifying unsuccessful retry procedures in the retry history table and again performing the identified unsuccessful retry procedures.

8. The method of claim 7, further comprising updating a retry bit in the retry history table for any of the identified unsuccessful retry procedures that is successful upon again being performed.

9. The method of claim 7, further comprising updating a count of retry hits in the retry history table upon again performing the identified unsuccessful retry procedures.

10. The method of claim 7, wherein again performing the identified unsuccessful retry procedures is done while a data storage device for the data storage medium is offline, further comprising ceasing performance of the identified unsuccessful retry procedures upon detecting a host interruption.

11. The method of claim 1, wherein the first zone corresponds to a LBA.

12. The method of claim 1, wherein the sequence of retry procedures is determined using a retry statistics table.

13. The method of claim 12, wherein the retry statistics table is based on at least one selected from the group consisting of: zones of the data storage medium, wedges of the data storage medium, LBAs of the data storage medium, and combinations thereof.

14. The method of claim 12, wherein a retry history table includes a count of retry hits for any retry procedure listed in the retry history table, further comprising updating the retry statistics table using the count of retry hits.

15. The method of claim 1, wherein no retry procedure is identified in the determination step, further comprising performing a retry procedure that is first in the sequence of retry procedures.

16. A machine-readable storage device including instructions that when executed cause a processor to perform operations comprising:
    detect an error in a first zone of a data storage medium;
    determine, upon detecting the error, whether any retry procedure of a sequence of retry procedures has been performed upon detecting a pervious error in the first zone; and
    if a first retry procedure of the sequence was unsuccessfully performed upon detecting the previous error, perform, upon detecting the error, a second retry procedure that follows next after the first retry procedure in the sequence without performing the first retry procedure.

17. A data storage device comprising:
    a data storage medium;
    a sequence of retry procedures that can be performed upon detecting an error in any of multiple zones on the data storage medium; and
    a retry history table, wherein if the retry history table indicates, upon the error being detected in a first zone, that a first retry procedure was unsuccessfully performed upon detecting a previous error in the first zone, the data storage device performs, upon detecting the error, a second retry procedure that follows next after the first retry procedure in the sequence without performing the first retry procedure.

18. The data storage device of claim 17, wherein the retry history table includes a count of retry hits for any retry procedure listed in the retry history table.

19. The data storage device of claim 18, wherein the retry history table includes a retry bit for any retry procedure listed in the retry history table, the retry bit indicating whether previous performance of a listed retry procedure was successful.

20. The data storage device of claim 17, further comprising a retry statistics table indicating the sequence of retry procedures.

21. The data storage device of claim 17, wherein the data storage device while offline performs unsuccessful retry procedures identified in the retry history table, and wherein the data storage device ceases performance of the identified unsuccessful retry procedures upon detecting a host interruption.

* * * * *